(12) United States Patent
Srinivasan

(10) Patent No.: US 8,965,423 B2
(45) Date of Patent: Feb. 24, 2015

(54) LOCATION, TIME, AND CONTEXT-BASED DEFERRED NOTIFICATIONS ON A MOBILE DEVICE

(76) Inventor: Sandeep Srinivasan, Palo Alto, CA (US)

( * ) Notice: Subject to any disclaimer, the term of this patent is extended or adjusted under 35 U.S.C. 154(b) by 57 days.

(21) Appl. No.: 13/493,202

(22) Filed: Jun. 11, 2012

(65) Prior Publication Data

US 2012/0315876 A1 Dec. 13, 2012

Related U.S. Application Data

(60) Provisional application No. 61/495,935, filed on Jun. 10, 2011.

(51) Int. Cl.
*H04W 4/00* (2009.01)
*H04W 4/12* (2009.01)
*H04L 29/06* (2006.01)
*H04W 4/02* (2009.01)

(52) U.S. Cl.
CPC ............. *H04W 4/12* (2013.01); *H04L 65/1096* (2013.01); *H04W 4/022* (2013.01)

USPC .......................................... 455/466; 455/412.1

(58) Field of Classification Search
USPC ........................ 455/414.1–414.4, 412.1, 466; 705/14.49–14.67
See application file for complete search history.

(56) References Cited

U.S. PATENT DOCUMENTS

| | | | |
|---|---|---|---|
| 8,219,067 B1 * | 7/2012 | Haldar et al. ............... | 455/412.2 |
| 2006/0089163 A1 * | 4/2006 | Khawand et al. ............. | 455/466 |
| 2007/0149214 A1 * | 6/2007 | Walsh et al. ............... | 455/456.1 |
| 2008/0057987 A1 * | 3/2008 | Landschaft et al. .......... | 455/466 |
| 2008/0133336 A1 * | 6/2008 | Altman et al. ................... | 705/10 |
| 2008/0208675 A1 * | 8/2008 | Wolmuth et al. ............... | 705/10 |
| 2009/0203389 A1 * | 8/2009 | Bhat ............................. | 455/466 |
| 2009/0311992 A1 * | 12/2009 | Jagetiya ..................... | 455/412.1 |
| 2011/0165895 A1 * | 7/2011 | Ryan ............................. | 455/466 |

* cited by examiner

*Primary Examiner* — George Eng
*Assistant Examiner* — Marcus Hammonds
(74) *Attorney, Agent, or Firm* — William C. Milks, III

(57) ABSTRACT

A method and system for a first user to provide a future notification (referred to as a deferred notification) on second user's mobile device based on the second user's location are disclosed.

23 Claims, 3 Drawing Sheets

US 8,965,423 B2

LOCATION, TIME, AND CONTEXT-BASED DEFERRED NOTIFICATIONS ON A MOBILE DEVICE

CROSS-REFERENCE TO RELATED PATENT APPLICATION

This application relates to U.S. Provisional Patent Application No. 61/495,935 filed on Jun. 10, 2011, entitled LOCATION, TIME, AND CONTEXT-BASED DEFERRED NOTIFICATIONS ON A MOBILE DEVICE, which is hereby incorporated herein in its entirety by this reference.

BACKGROUND OF THE INVENTION

The present invention relates generally to mobile devices, for example, cellular telephones, PDA's, and the like, and, more particularly, to mobile devices incorporating a geographical positioning system (GPS) feature or other technology to enable the location of the mobile device to be determined. More particularly, various examples of the present invention provide a method and system for a first user to initiate a future notification(s) on a second user's mobile device wherein notification of the second user is dependent at least in part on the second user's location. In addition, users can provide themselves a future notification(s).

SUMMARY OF THE INVENTION

In accordance with the present invention, various examples of a method and system for scheduling a notification on a user's mobile device by another user are provided. In accordance with various examples, a method and system enable one user (referred to as the "Sender") having a first device, for example, a computer system or mobile device, to structure a notification to at least one other user (referred to as the "Receiver(s)") having a mobile device(s), using SMS, email, a web application such as Facebook, or a mobile application, to specify a location at which the Receiver(s) will receive the notification at a future time (referred to as a "deferred notification"). In accordance with one example, the notification is deferred and received on a Receivers's mobile device when the Reveiver is at the specified location at a future time and is willing to accept such a deferred notification from the Sender. In accordance with another example, the one user can send a deferred notification to himself or herself.

An advantage is that the Sender can leave a message for his or her friend(s) and/or family member(s) or even herself or himself (Receiver(s)) that will be sent at some future time, when the Receiver(s) is(are) at a specified location. Accordingly, important messages can be created in advance, so that the Receiver(s) will receive the message at the right place at a future time, and, preferably, when any other additional criteria for the deferred notification have been met. The additional criteria for the deferred notification are referred to as "context" wherein, for example, context can be a Receiver's preferences.

BRIEF DESCRIPTION OF THE DRAWING

The various examples of the present invention will be described in conjunction with the accompanying figures of the drawing to facilitate an understanding of the present invention. In the drawing.

DETAILED DESCRIPTION OF THE VARIOUS EXAMPLES

In accordance with various examples of the present invention, a method and system for one user initiating a future notification on another user's mobile device will be described. In accordance one example, the method and system enable a user (referred to as the "Sender") having a first device, for example, a computer system or a mobile device such as a cellular telephone or PDA, to provide a notification to at least one other user (referred to as the "Receiver(s)") having a mobile device(s), using SMS, email, a web application such as Facebook, or a mobile application, to specify a particular location or an area within a given distance of a particular location and also a specified time window during a future time period during which the notification may be issued.

Figure 1:
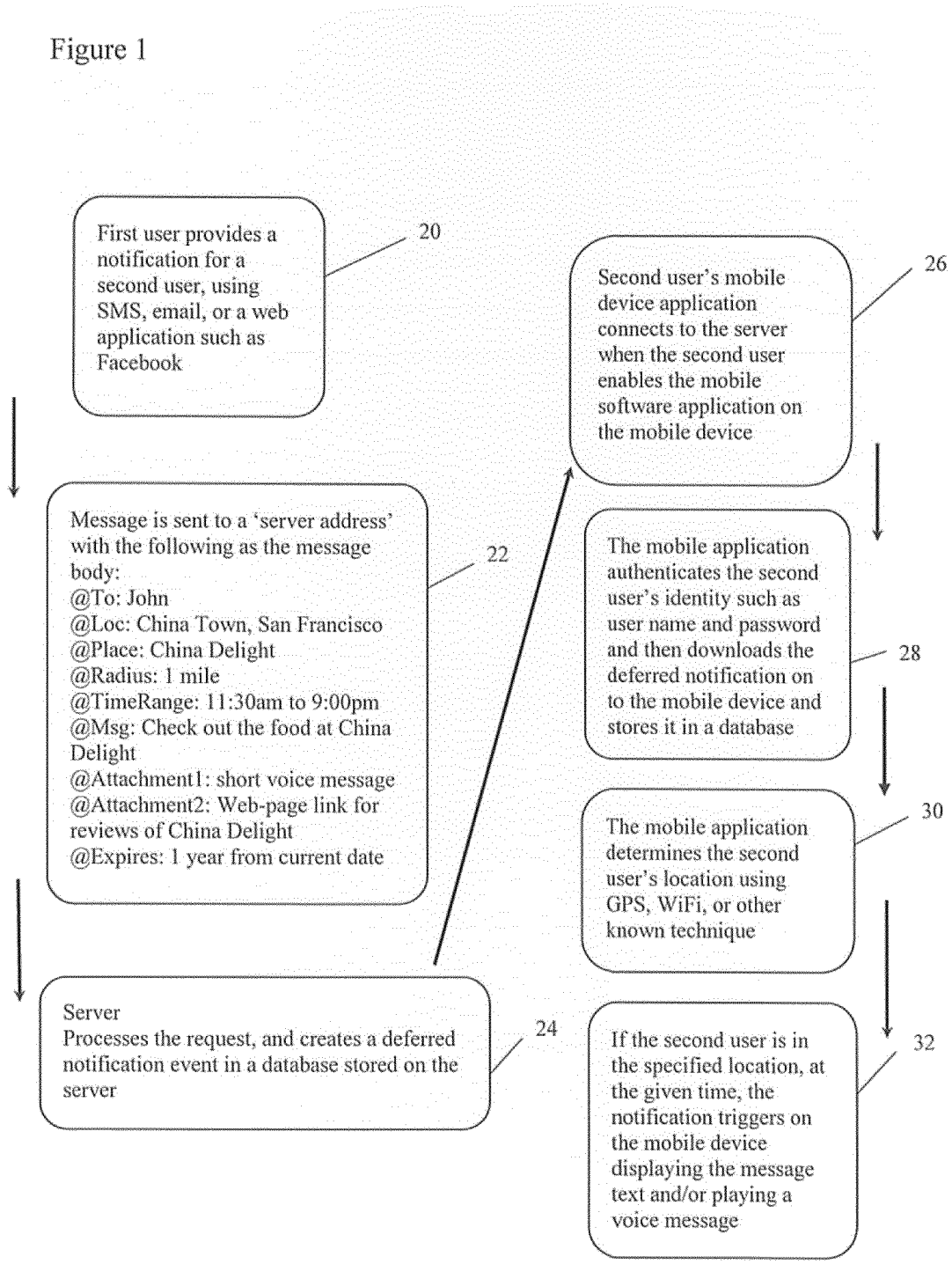
FIG. 1 is a flow diagram which illustrates an example of the deferred notification method in accordance with the present invention.

Referring now to the drawing, in accordance with an example, a first user, referred to as the Sender, sends a message that may be received by at least one other user, referred to as the Receiver(s), having a mobile device(s), using SMS, email, a web application such as Facebook, or a mobile application, as indicated by the numeral 20 shown in FIG. 1. In the example, the sent message preferably contains at least a location where a notification will become active and a time range or window within which the notification will become active, and may also contain additional optional parameters that constitute criteria to trigger the deferred notification. As indicated by the numeral 22 shown in FIG. 1, the message generated by the Sender preferably contains the following parameters: at least one Receiver mobile device address (e.g., @To: John); a specified location (e.g., @Loc: China Town, San Francisco); a specified time period (e.g., @TimeRange: 11:30 am to 9:00 pm); and a message text (e.g., @Msg: Check out the food at China Delight) and/or an attachment, if any (e.g., @Attachment1: short voice message or other attachment). The Sender message may alternatively or additionally contain one or more of the following additional parameters: a particular location or a place (e.g., @China Delight); a distance range (e.g., @Radius: 1 mile); an additional attachment (e.g., @Attachment2: web-page link relating to reviews of China Delight); and a date range from the current date during which the notification is effective (e.g., @Expires: 1 year from current date). Thus, the notification preferably contains a message body including, for example, a short message text, short voice clip, or other web content such as web-page links, as part of the deferred notification. The message generated by the Sender is transmitted to a communications server which processes the message and generates a pending deferred notification event that is preferably stored in a database accessible by the communications server, as indicated by the numeral 24 shown in FIG. 1.

As shown in FIG. 1, the user who is addressed in the message (e.g., @To: John) may receive pending deferred notifications by launching a mobile device deferred notification application installed on his or her mobile device to enable communication with the communications server, as indicated by the numeral 26. As indicated by the numeral 28 shown in FIG. 1, the mobile device deferred notification application preferably authenticates the potential Receiver's identification by requiring a log-in such as a user name and password, and then preferably downloads any pending deferred notification(s) to the Receiver's mobile device, for example, to a database in memory comprising the mobile device. In accordance with another example, the deferred notification may be transmitted by the communications server and received on the Receiver's mobile device only when the mobile device deferred notification application is active on the mobile device and the location and time window and any additional criteria or context such as the Receiver's preferences are met.

If the mobile device deferred notification application is active on the mobile device of the Receiver, the application determines the Receiver's location using the geographical location feature of the mobile device, as indicated by the numeral 30 shown in FIG. 1. The Receiver's geographical location may be determined by GPS, WiFi, or other known techniques. As indicated by the numeral 32 shown in FIG. 1, in accordance with one example, if the Receiver is at or within a distance of a specified location at a future time within a time window and date range from the current date, the deferred notification is triggered on the Receiver's mobile device. The deferred notification is preferably in the form of the text message authored by the Sender or in the form of playing a voice message created by the Sender. The notification is deferred and only received on the Receiver's mobile device when the receiver is at or within a specified distance from a specified location or place, at a future time within the specified time window and date range from the current date, and the Receiver is willing to accept such a deferred notification from the Sender, as indicated by the numeral 32 shown in FIG. 1.

Consequently, in accordance with one example, the Sender can specify a particular location or a specified area within a distance of the particular location at which the Receiver will receive the deferred notification at a future time. The notification is deferred and received on the Receiver's mobile device when the Receiver is at or within a specified distance from that location, at a future time within a specified time window and range of dates from the current date, and the receiver is willing to accept the deferred notification from the Sender as evidenced by the Receiver having the mobile device deferred notification application in operation on his or her mobile device. In accordance with another example, the Receiver can choose to accept or reject such a deferred notification by selectively allowing or denying messages from specific Senders by setting a preference on the Receiver's mobile device.

The method and system in accordance with the examples of the present invention enable a Sender to send a location and time specific notification to a Receiver, wherein the notification becomes active when the Receiver is in the specified location within the specified time. The method and system allow the Sender to generate a deferred notification message by sending an SMS or email to a computer server, wherein the notification contains a target location and a range of time. The method and system also enable generating deferred notifications from existing social networking sites, for example, Facebook.

An example utility in accordance with a specific instantiation of the present invention is the ability for a user to leave a recommendation for a friend or family member, which is triggered in the future. For example: User1 posts a Facebook message to User2 with the following text: "Next time you are @ China Town, San Francisco @ check out the food at the China Delight for @ dinner @". This message is delivered to User2's mobile device if the User2 is in China Town in San Francisco and if it is dinner time.

Another example utility is one user posting a message in the form of a question on a second user's Facebook page. If the second user replies to the question, the reply to the first user's message is triggered in the future at the requested location. For example:
User1 posts a Facebook message to User2 with the following text: "John, What is a good place for lunch @Location in the Mission District in San Francisco@?".
A reply to the message is delivered to User1's mobile device if User2 replies to the message on Facebook, when User1 is in the Mission District in San Francisco.

In accordance with another example, the first user and the second user are the same person. Accordingly, a user can send a deferred notification to himself or herself.

Figure 2:
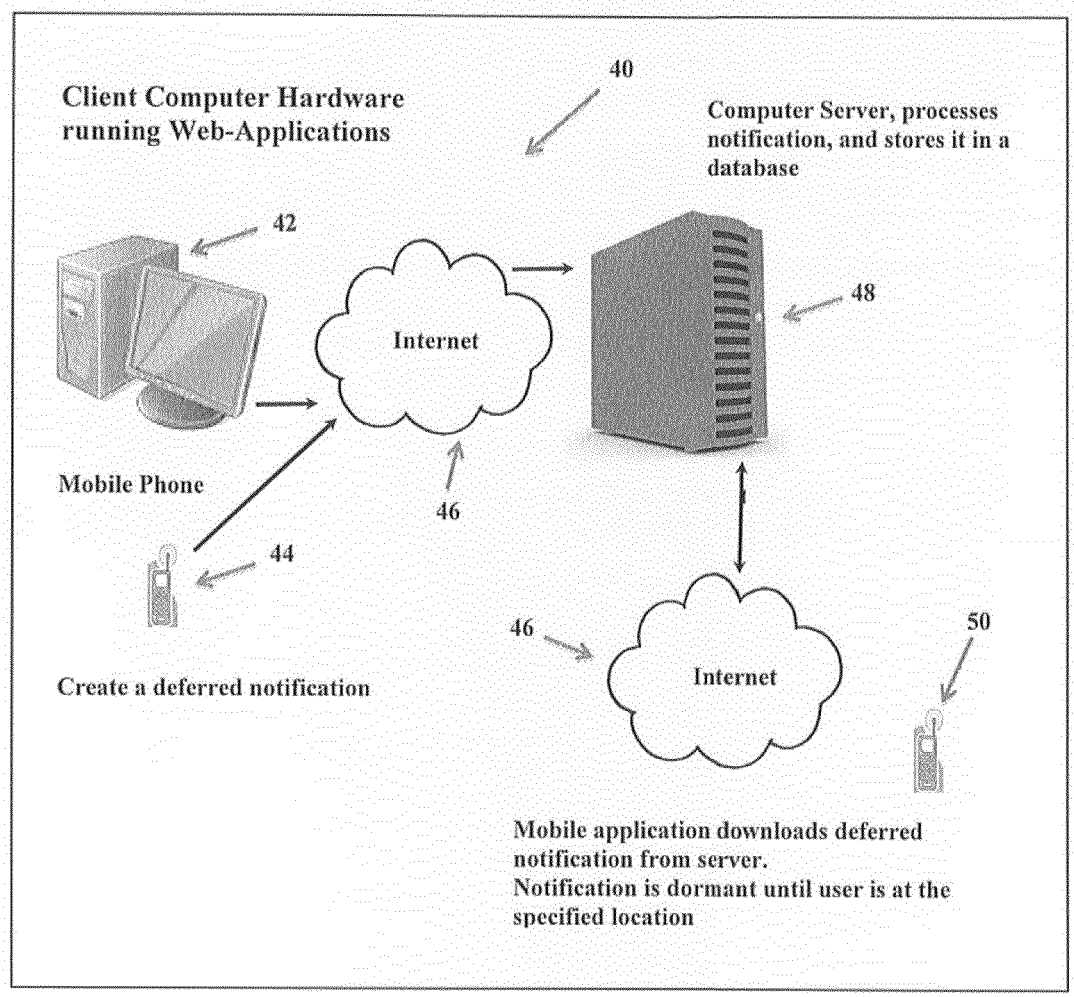
FIG. 2 is a block diagram of an example of a system for creating deferred notifications in accordance with the present invention.

FIG. 2 shows one example of a system in accordance with the present invention for creating a deferred notification. The system 40 comprises a client computer system such as a personal computer 42 running a deferred notification web application or mobile phone 44 of a Sender running a deferred notification mobile application to create a deferred notification message in accordance with the method described in conjunction with FIG. 1. The message is transmitted via the Internet or World Wide Web 46 to a server 48 which stores the message in a database accessible by the server. The deferred notification is transmitted by the server 48 to a mobile device 50 of a Receiver running a deferred notification mobile application via the Internet or World Wide Web 46.

Figure 3:
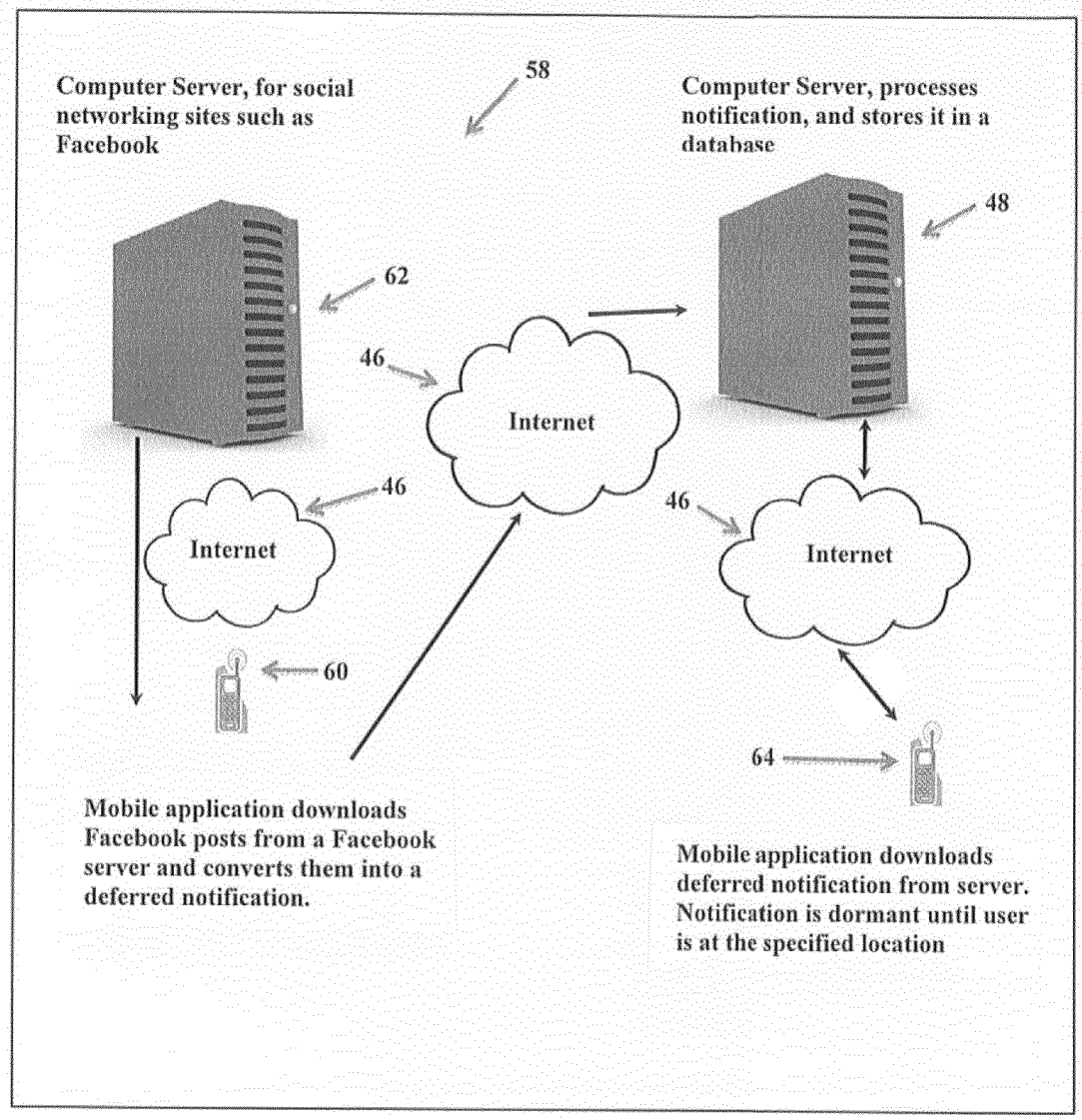
FIG. 3 is a block diagram of an example of a system involving a social networking web site for creating deferred notifications in accordance with the present invention.

In accordance with another example of a system 58 shown in FIG. 3, a deferred notification mobile application running on a Sender's mobile phone 60 downloads posts from a server 62 at a social networking web site, for example, Facebook, via the Internet or World Wide Web 46. The application converts the posts into a deferred notification message in accordance with the method described in conjunction with FIG. 1. The message is transmitted via the Internet or World Wide Web 46 to a server 48 which stores the message in a database accessible by the server. The deferred notification is transmitted by the server 48 to a mobile device 64 of a Receiver running a deferred notification mobile application via the Internet or World Wide Web 46.

While the foregoing description has been with reference to particular examples of the present invention, it will be appreciated by those skilled in the art that changes in these examples may be made without departing from the principles and spirit of the invention. Accordingly, the scope of the present invention can only be ascertained with reference to the appended claims.

What is claimed is:

1. A method by which a deferred notification is provided, comprising:
generating a message associated to a notification to be received by at least one user having a mobile device, wherein the generated message specifies an address for the at least one user's mobile device and at least a location or area where a notification will become active, a date range from a current date within which the notification will become active, and a future time or future time range within which the notification will become active;
transmitting the generated message to a server which processes the message and produces a pending deferred notification;
selectively enabling the user's mobile device under control of the user to receive the pending deferred notification from the server when a deferred notification mobile application launched under control of the user is active on the user's mobile device and all user preferences associated to the user's mobile device are met;

selectively downloading the pending deferred notification to the user's mobile device if the user's mobile device is enabled to receive the pending deferred notification;

if the user's mobile device is enabled to receive the pending deferred notification, determining a location of the mobile device using a geographical location feature of the mobile device; and if the location of the mobile device is at the location or within the area specified by the message within the date range specified by the message and at the future time or within the future time range specified by the message, triggering a deferred notification event on the user's mobile device;

wherein the notification is deferred and triggered on the user's mobile device when the mobile device is at the location or within the area specified in the message within the date range and at the future time or within the future time range specified in the message.

2. The method of claim 1 wherein the message is generated using SMS, email, a web application, or a mobile application.

3. The method of claim 1 wherein the message is generated using one or more posts downloaded from a social networking web site server.

4. The method of claim 1 wherein the generated message further comprises a question or at least one of a message text and an attachment.

5. The method of claim 4 wherein the attachment is a voice message or a web-page link, whereby the deferred notification provides at least a message text and at least one of a voice clip and web-page link.

6. The method of claim 1 wherein the generated message further comprises one or more parameters selected from among the group of parameters consisting of a particular place to define the location and a distance range with respect to a location to define the area within which the pending deferred notification will be effective.

7. The method of claim 1 wherein the server stores the deferred notification in a database accessible by the server.

8. The method of claim 1 wherein selectively enabling the user's mobile device under control of the user to receive the pending deferred notification from the server is in response to the user launching a deferred notification mobile application installed on the mobile device.

9. The method of claim 1 wherein downloading the pending deferred notification to the user's mobile device comprises downloading the deferred notification to a database in memory comprising the mobile device.

10. The method of claim 1 wherein the geographical location is determined by GPS or WiFi.

11. The method of claim 1 wherein the deferred notification event is manifested in the form of a text message or in the form of a voice message created when the message is generated.

12. The method of claim 1 wherein there is a plurality of user mobile devices and generating a message to be received by at least one user having a mobile device comprises generating a message which specifies an address for each of the plurality of users' mobile devices.

13. The method of claim 1 wherein the message is generated by a user and generating a message to be received by at least one user having a mobile device comprises specifying an address for that user's mobile device.

14. The method of claim 1 wherein the message is generated using a computer system or a mobile device.

15. A method by which a deferred notification is provided, comprising:

generating a message associated to a notification to be received by at least one user having a mobile device, wherein the generated message specifies an address for the at least one user's mobile device and at least a location or area where a notification will become active and a future time or future time range within which the notification will become active;

transmitting the generated message to a server which processes the message and produces a pending deferred notification;

launching a deferred notification mobile application installed on the mobile device under control of the user to selectively enable the user's mobile device to receive the pending deferred notification from the server;

determining that the deferred notification mobile application launched under control of the user is active on the mobile device and all user preferences associated to the user's mobile device are met to enable the user's mobile device to receive the pending deferred notification from the server;

selectively downloading the pending deferred notification to the user's mobile device if the user's mobile device is enabled to receive the pending deferred notification;

if the user's mobile device is enabled to receive the pending deferred notification, determining a location of the mobile device using a geographical location feature of the mobile device; and if the location of the mobile device is at the location or within the area specified by the message at the future time or within the future time range specified by the message, triggering a deferred notification event on the user's mobile device;

wherein the notification is deferred and triggered on the user's mobile device when the mobile device is at the location or within the area specified in the message at the future time or within the future time range specified in the message.

16. The method of claim 15 wherein selectively downloading the pending deferred notification to the user's mobile device comprises authenticating the user's identification by requiring the user of the mobile device to log-in.

17. The method of claim 16 wherein the log-in comprises a valid user name and password.

18. A method by which a deferred notification is provided, comprising:

generating a message associated to a notification to be received by at least one user having a mobile device using one or more posts downloaded from a social networking web site server, wherein the generated message specifies an address for the at least one user's mobile device and at least a location or area where a notification will become active and a future time or future time range within which the notification will become active;

transmitting the generated message to a message server which processes the message and produces a pending deferred notification;

selectively enabling the user's mobile device to receive the pending deferred notification from the message server when a deferred notification mobile application launched under control of the user is active on the user's mobile device and all user preferences associated to the user's mobile device are met;

selectively downloading the pending deferred notification to the user's mobile device if the user's mobile device is enabled to receive the pending deferred notification;

if the user's mobile device is enabled to receive the pending deferred notification, determining a location of the mobile device using a geographical location feature of the mobile device; and if the location of the mobile device is at the location or within the area specified by the message at the future time or within the future time range specified by the message, triggering a deferred notification event on the user's mobile device;

wherein the notification is deferred and triggered on the user's mobile device when the mobile device is at the location or within the area specified in the message at the future time or within the future time range specified in the message.

19. The method of claim 18 wherein generating the message to be received by at least one user having a mobile device using one or more posts from a social networking web site server comprises automatically inferring location or context aware messages from a social network to be presented on the user's mobile device at a future time.

20. The method of claim 19 wherein a user signs up once for a particular feed of information from a given social network such that any information that has location associated thereto is automatically presented to the user at a future time.

21. A method by which a deferred notification is provided, comprising:

generating a message by a first user of a first mobile device associated to a notification to be received by the first mobile device, wherein the message posts a question on a web page associated to a second user of a second mobile device;

transmitting the message to a server which processes the message and produces a pending deferred notification in response to a reply to the question by the second user;

selectively enabling the first mobile device under control of the first user to receive the pending deferred notification from the server when a deferred notification mobile application launched under control of the first user is active on the first user's mobile device and all user preferences associated to the first user's mobile device are met;

selectively downloading the pending deferred notification to the first mobile device if the first mobile device is enabled to receive the pending deferred notification and the second user replies to the question;

if the first mobile device is enabled to receive the pending deferred notification, determining a location of the first mobile device using a geographical location feature of the first mobile device; and if the location of the first mobile device is at a location or within an area specified by the question and at a future time or within a future time range specified by the question, triggering a deferred notification event on the first mobile device comprising the reply by the second user;

wherein the notification is deferred and triggered on the first mobile device when the first mobile device is at the location or within the area specified in the question at the future time or within the future time range specified in the question.

22. A method by which a deferred notification is provided, comprising:

generating a message by a first user associated to a deferred notification to be received by a second user, wherein the message posts a communication on a web page for the second user;

transmitting the message to a server which processes the message and produces a pending deferred notification in response to the message;

selectively enabling a mobile device of the second user under control of the second user to receive the pending deferred notification from the server on the second user's mobile device when a deferred notification mobile application launched under control of the second user is active on the second user's mobile device and all user preferences associated to the second user's mobile device are met;

selectively downloading the pending deferred notification to the second user's mobile device if the second user's mobile device is enabled to receive the pending deferred notification;

if the second user's mobile device is enabled to receive the pending deferred notification, determining a location of the second user's mobile device using a geographical location feature of the second user's mobile device; and if the location of the second user's mobile device is at a location or within an area specified by the message and at a future time or within a future time range specified by the message, triggering a deferred notification event on the second user's mobile device;

wherein the notification is deferred and triggered on the second user's mobile device when the second mobile device is at the location or within the area specified in the generated message at the future time or within the future time range specified in the message.

23. The method of claim 22 wherein the communication comprises a request and selectively enabling the second user's mobile device under control of the second user to receive the pending deferred notification from the server on the second user's mobile device comprises acceptance of the request by the second user.

* * * * *